US008568550B2

(12) United States Patent
Zachau et al.

(10) Patent No.: US 8,568,550 B2
(45) Date of Patent: Oct. 29, 2013

(54) METHOD FOR THE PRODUCTION OF A PROTECTION DEVICE

(75) Inventors: Thilo Zachau, Neuengoenna (DE); Helga Goetz, Heidesheim (DE); Stefan Haase, Neider-Olm (DE); Andreas Habeck, Undenheim (DE); Stephan Corvers, Oestrich-Winkel (DE); Volker Plapper, Alzey (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 13/278,522

(22) Filed: Oct. 21, 2011

(65) Prior Publication Data

US 2012/0096703 A1   Apr. 26, 2012

(30) Foreign Application Priority Data

Oct. 22, 2010  (DE) .......................... 10 2010 042 812

(51) Int. Cl.
    *B29C 65/00* (2006.01)
    *B32B 37/00* (2006.01)
    *B32B 38/04* (2006.01)

(52) U.S. Cl.
    USPC ........... 156/257; 156/253; 156/268; 156/211; 125/23.01

(58) Field of Classification Search
    USPC ................. 156/253, 257, 268, 211; 89/36.02, 89/36.04, 36.05; 2/2.5; 1/253, 257, 268, 1/211; 125/23.01
    See application file for complete search history.

(56) References Cited

U.S. PATENT DOCUMENTS

| 3,018,210 | A  | * | 1/1962 | Frieder et al. .............. 2/2.5 |
| 6,792,843 | B2 |   | 9/2004 | Mohr et al. |
| 2003/0110932 | A1 |   | 6/2003 | Mohr et al. |
| 2004/0084043 | A1 | * | 5/2004 | Mingarelli et al. ........ 125/23.01 |
| 2005/0129909 | A1 |   | 6/2005 | Hermens et al. |
| 2005/0217471 | A1 | * | 10/2005 | Benitsch .................. 89/36.02 |
| 2007/0125223 | A1 |   | 6/2007 | Heidenreich et al. |
| 2008/0173687 | A1 |   | 7/2008 | Hoetzel |
| 2009/0258187 | A1 |   | 10/2009 | Brady et al. |
| 2009/0320675 | A1 |   | 12/2009 | Landingham et al. |
| 2010/0071536 | A1 | * | 3/2010 | Nedele .................... 89/36.02 |
| 2010/0288115 | A1 | * | 11/2010 | Pfister .................... 89/36.02 |
| 2012/0118133 | A1 | * | 5/2012 | Saucedo .................. 89/36.02 |

FOREIGN PATENT DOCUMENTS

| DE | 9006087 | 5/1990 |
| DE | 90 06 087.3 U1 | 11/1991 |
| DE | 102004026515 A1 | 12/2005 |

(Continued)

OTHER PUBLICATIONS

European search report in corresponding European Application No. 11186163.9 dated Feb. 17, 2012.

(Continued)

Primary Examiner — Linda Gray
(74) Attorney, Agent, or Firm — Ohlandt, Greeley, Ruggiero & Perle, LLP.

(57) ABSTRACT

A method for the production of protection devices is provided. The method includes the step of providing a tile package. The provision of the tile package includes the steps of: laminating at least one board of a tile material onto a polymer foil; scoring the board on the side which is opposite to the polymer foil; and fracturing the board along the scoring lines for achieving a plurality of tiles which are fixed on the polymer foil.

16 Claims, 8 Drawing Sheets

Exposure side

Object side (56) References Cited

FOREIGN PATENT DOCUMENTS

| | | |
|---|---|---|
| DE | 202008014264 | 10/2008 |
| EP | 01524104 A1 | 9/2004 |
| EP | 01942082 A1 | 12/2007 |
| FR | 2727507 A1 | 8/1986 |
| GB | 2377006 | 12/2002 |
| GB | 2475023 | 5/2011 |
| GB | 2475023 B | 5/2011 |
| WO | 0185443 A1 | 5/2001 |
| WO | WO 01/85443 A1 | 11/2001 |
| WO | 2007058665 | 5/2007 |

OTHER PUBLICATIONS

Examination report dated May 10, 2011 in corresponding German Application No. 10 2010 042 812.4-15 with English Translation and certification of translation.

Examination report dated Jul. 29, 2011 in corresponding German Application No. 10 2010 042 812.4-15 with English Translation and certification of translation.

Decision to Grant dated Jan. 19, 2012 in corresponding German Application No. 10 2010 042 812.4-15 with English Translation and certification of translation.

* cited by examiner

Exposure side

Object side

Figure 10

METHOD FOR THE PRODUCTION OF A PROTECTION DEVICE

CROSS REFERENCE TO RELATED APPLICATIONS

This application claims benefit under 35 U.S.C. §119(a) of German Patent Application No. 10 2010 042 812.4-15, filed Oct. 22, 2010, the entire contents of which are incorporated herein by reference.

BACKGROUND OF THE INVENTION

1. Field of the Invention

The present invention relates to a method for the production of a protection device for protecting against slaps, stabs, cuts, ballistic and compression wave influences, a protection device produced by this method and uses of the protection device. The protection device may be used for the protection of buildings, persons, in particular passengers of vehicles, and other objects which may be exposed to the danger of damaging influences.

2. Description of Related Art

In prior art protection devices having a multilayer construction which contain within respective layers a plurality of individual tiles are known. The design of such protection devices with a plurality of tiles provides the advantage that after one single hit not the total protection function is lost due to the destruction of one board, but further tiles are present for the protection of the respective object. Such a protection device is, for example, disclosed in WO 01/85443 A1.

Such protection devices consisting of a plurality of tiles in comparison to protection devices built from large boards have the disadvantage that the tiles have to be assembled one after the other during a laborious production method and that the production and handling of many single components is also expensive. In addition, the adhesives with which the single tiles are assembled in prior art have to fulfil high demands. Regularly, these joints are the most vulnerable sites of the protection devices in prior art. Thus, measures have to be taken to protect, for example, the gaps between the single tiles which are filled with adhesive. Such protection devices are, for example, described in DE 90 06 087 U1.

US 2009/0320675 A1 describes a transparent protection device in which transparent tiles are bonded together with a transparent polymer material with adjusted refractive index and are laminated onto a transparent supporting board. Several layers of tiles which are bonded together may be laminated onto each other, wherein the edges of the tiles which are perpendicular to the exposure face do not overlap from layer to layer. In addition, the production method is laborious, because small single tiles have to be prepared separately and have to be bonded together with an adhesive.

It is in common for protection devices according to prior art that normally very small tiles have to be individually prefabricated and assembled in a mosaic manner. Thereafter the tiles are bonded together in a dense packed manner, optionally with a carrier and subsequently remaining gaps are filled with jointing compound. An exact contour accuracy of the tiles has to be ensured in each case.

BRIEF SUMMARY OF THE INVENTION

It is therefore the object of the present invention to provide a method for the production of protection devices and protection devices based on this method which also provide their protection function in the case of several hits and which nevertheless can be produced cost-effectively.

BRIEF DESCRIPTION OF THE SEVERAL VIEWS OF THE DRAWINGS

The figures are for illustration of the subject matter of the present invention and they do not limit the subject matter of the patent claims.

DETAILED DESCRIPTION OF THE INVENTION

In particular, the object is solved by a method for the production of protection devices which comprises the step of providing a tile package. Providing a tile package comprises the steps of: laminating at least one board of a tile material onto a polymer foil, scoring the board on the side which is opposite to the polymer foil, and fracturing the board along the scoring lines for achieving a plurality of tiles which are fixed on the polymer foil.

Then, the thus obtained tile package can be assembled with further layers to a protection device, e.g. an armor protection element. In principle, the further layers are layers which are usually used in the production of protection devices, in particular cover layers/cover boards, intermediate layers, non-segmented boards and/or backing layers. Preferable embodiments of such layers are described below.

Preferably, exactly one board is laminated per polymer foil, because in this case no laborious arrangement of several boards on the polymer foil is necessary. Before the lamination procedure the board can easily be cut to the desired dimension. Scoring the board can be conducted before or after the lamination procedure.

Through the fracturing of the board of the tile material along the obtained scoring lines several prisms having multiangular base areas which are free, but are connected through the polymer foil, are obtained (tiles). Preferably, the fracturing occurs by tensile load of the scoring lines. The tiles continue to strongly adhere at the polymer foil. The scoring and fracturing procedures are preferably conducted in an optimized manner to avoid development of spalls. Obtained are tile packages comprising single tiles which are bounded to each other through the polymer foil, wherein the gaps between adjacent tiles, which means gaps at which adjacent tiles adjoin, represent the peripheries (also: "fracturing planes") of a common fracturing gap.

The flexibility of the polymer foil allows on the one hand the fracturing of the board by tensile load and on the other hand the use of the protection device according to the present invention in flexible materials such as bullet-proof vests.

Optionally, the fracturing of the board is obtained by the exposure of a steep temperature-time gradient of >±50 K/min, in particular in the case of a material of the board, which has a coefficient of thermal expansion in the temperature range of 30 to 300° C. of higher than 5 ppm/K.

Preferably, the scoring of the board is conducted by the use of cutting means which score the material, such as in particular with the help of a laser and/or a cutting wheel. In this case, preferably with a minimum number of cuts a maximum number of regular polygons are traced. In this case, according to the present invention the following geometric forms are preferred: equilateral triangles, trapezia, regular hexagons and equilateral triangles, and regular pentagons and isosceles and ordinary triangles.

Preferably, the scoring is conducted such that the fracturing of all scoring lines is guaranteed. Preferably, the boards are scored such that the tiles have equally sized base areas and that preferably as much as possible tiles have consistent geometric forms.

If the fracturing procedure leads to the production of spalls, a step of removing these spalls is preferably conducted subsequently.

Preferably, the method according to the present invention further comprises the step of laying at least two tile packages on top of each other and that of the subsequent lamination. In this step optionally a fiber material component may be added between the polymer layers, wherein with "polymer layers" the layers which consist of polymers, such as for example polymer foil and intermediate layer, are meant. The individual tile packages are laid on top of each other in such a manner that the intersection points of the gaps of different tile packages do not lay on top of each other. Preferably, as far as possible the tiles of the one tile package should preferably cover the gaps between the tiles of the other tile package completely. Optionally, a step of fitting the thus obtained laminate into a metal frame or a metal casing may be conducted subsequently.

Preferably, the polymer foil onto which a board is laminated has a thickness of between 0.1 and 3 mm, more preferably 0.3 to 1.3 mm. The lamination of the polymer foil onto the board is conducted at temperatures and pressures which allow the board to strongly adhere to the polymer and at the same time to avoid outgassing of substances which are physically dissolved in the polymer. The preferred polymers of the polyvinyl butyral-type, thermoplastic polyurethane-type as well as ethylene vinylacetate-type, which are for example also used for the production of laminated multilayer safety glass, are preferably processed in the temperature range of 75 to 200° C. and at preferable pressures which are higher than ambient pressure of 3 to 15 bar. Preferably, the heating and cooling rates are in a range of 1 to 20 K/min and the exposure times at maximum temperatures are in the range of 1 to 300 min.

In principle, the production of a composite according to the present invention, comprising tiles which are fixed on polymer foil (tile packages) and additional such or non-segmented boards of brittle fragile materials, fiber materials, fiber composite materials, metals and other polymers, is conducted under similar process conditions such as the procedure of laminating the polymer foil onto the board.

Preferably, the protection devices have at least two layers with respectively at least one and preferably exactly one tile package, wherein the tile package comprises tiles and a foil and wherein the tiles adjoin at gaps and are mounted together on a foil, wherein further the intersection points of the gaps of each tile package are oppositely arranged with respect to tiles of the respectively following tile package. This means that the intersection points of the gaps of each tile package are not arranged above the intersection points or gaps of a following tile package, but above the surface areas of the following tiles.

In this case, the intersection point of gaps is a site within the tile package at which at least two gaps meet each other, so that at least three tiles adjoin at this site, separated by the respective intersection point.

Thus, the tile packages are preferably arranged such that the gaps of each tile package do not substantially continue in the following tile package which is directly arranged thereunder, but that rather the gaps of the lower tile package are mainly covered by the tiles of the package which is directly arranged thereover.

According to the present invention the protection device may comprise two, three or also more than three of these tile packages. In one embodiment the protection device comprises two or three tile packages. In embodiments which are designed for particularly safe protection against particularly high attack energy it is preferred that the protection device comprises up to five tile packages.

The tile packages are prepared by a lamination method. The protection device can be prepared by the production method according to the present invention, wherein normally and preferably besides at least one tile package additional components in the form of further layers are introduced. In principle, protection devices are possible which besides the at least one tile package do not comprise any further layers.

The production method according to the present invention allows the production of complex total geometries, such as for example complete car doors, in few simple process steps. It is not necessary to assemble reams of prefabricated individual components in a puzzle-like manner. Thus, this method can be conducted cheaply as an automatable process. In particular, no specific jointing compounds are necessary.

In one embodiment of the invention the tiles of at least one tile package are fiber-reinforced. Suitable fiber materials are silicium carbide fibers, carbon fibers and ceramic fibers. Particularly preferably, all tiles in the protection device are fiber-reinforced.

The "exposure side" of the protection device prepared according to the present invention is the side, which is opposite to the object to be protected. Usually, this is the side from which a potentially detrimental exposure onto the object to be protected has to be expected. The side, which is directed at the object to be protected, is the "object side".

In preferable embodiments the protection devices according to the present invention have at least one cover board on the exposure side of the tile packages. The cover board may be fabricated of different materials. The kind of the material of the cover board depends on the intended use of the protection device. If, for example, the protection device is used as a component of a bullet-proof vest, the cover board is fabricated of a flexible material, such as a woven fabric. If the protection device is used in vehicles or buildings, brittle fragile materials, polymer materials, metals, carbon fibers, wood or the like may be used as material of the cover boards.

Preferably, the cover board is laminated with an intermediate layer onto the first tile package at the exposure side. Preferably, the thickness of the intermediate layer is 0.1 to 30 mm, more preferably 1 to 22 mm and particularly preferably 3 to 10 mm. Preferably, the intermediate layer is a polymer layer. The intermediate layer preferably comprises epoxy-based polymers, polyvinyl butyrals, polyethylene vinylacetals, polyurethanes or mixtures thereof.

In preferred embodiments the protection device according to the present invention has at least one backing layer on the object side of the tile packages. The backing layer supports the protective effect, in particular the complete deceleration of bullet fragments and tile spalls. Preferably, this backing layer is a polymer layer. Preferably, it comprises polycarbonate, polymethylene methacrylate, aramid fibers (fabric or woven fabric), kevlar fibers (fabric or woven fabric) or combinations thereof. In preferable embodiments the backing layer consists of several polymer layers.

Preferably, the backing layer is bounded with the first tile package at the side of the object via an intermediate layer. Preferably, this intermediate layer is a polymer layer. Preferably, the intermediate layer comprises epoxy-based polymers, polyvinyl butyrals, polyethylene vinylacetals, polyurethanes or mixtures thereof. In preferred embodiments the foil of the adjacent tile package serves as an intermediate layer.

A preferable embodiment according to the present invention relates to a protection device, which comprises tiles that contain metal particles. Preferred metal particles are iron turnings, non-iron metal turnings and turnings of metal alloys. Preferable, the volume of the particles is smaller than 10 mm$^3$, wherein the length-diameter ratio is preferably higher than 2 to 1.

In a preferred embodiment the tiles of at least one tile package carry burlings on at least one surface. The burlings are in particular burlings with ellipsoid dome-shaped form. Preferably, the burlings are arranged on the surface of the tiles on the side of the object. Preferably, the heights of the burlings are 0.1 to 1 mm. Preferably, the semimajor axis of the burlings has a length of 0.1 to 1 mm, wherein the preferred distances of adjacent burling peaks are 0.5 to 5 mm. Thus preferably, the burlings are arranged on that surface of the tiles which is in contact with the foil of the tile package. Consequently, high sonic isolation is achieved. Furthermore, the sound and shock waves passing through the tiles are differently reflected from the burlings, so that an interference of incident and reflected waves results in an optimum extinction.

The tile packages are particularly advantageously orientated such that the gaps between the adjacent tiles are mainly arranged in a perpendicular manner with respect to the exposure side. Advantageously, due to the production method of the tile packages it can be achieved that the gaps are partly filled with the foil material. But preferably, at least a part of the gaps is not completely filled with foil material. Preferably, this applies to all gaps. Thus, an optimum sonic isolation of the individual tiles in parallel orientation with respect to the exposure area is achieved. In particular embodiments no polymer is present in the gaps.

Polymer material which preferably has been penetrated into the gaps because of capillary forces due to the production process results in a strong connection of the tiles among themselves. The degree of infilling with polymer material depends on the viscosity of the material during the production process and, thus, on the process temperature. The process temperature is the temperature at which the polymer foil is bonded with the board of the tile material. Preferably, the process temperature is such high that the viscosity of the polymer decreases to values allowing a residual volume of gaseous components in the gaps between the tiles of 0 to <100% by volume, preferably 0 to 33% by volume, particularly preferably 0 to <10% by volume.

The tiles are prismatic and preferably have triangular, quadrangular, pentagonal or hexangular base areas, wherein the board of the tile material is scored accordingly during the production method. Preferably, the tiles comprise glass or glass ceramic, wherein in particular they mainly consist thereof. According to the present invention it is also possible to use a glass ceramic for the production of a part of the tiles within the protection device, to use a glass for another part and to use another brittle fragile material for a further part thereof. In preferred embodiments at least two of the tile packages which are arranged in the protection device have different tile geometries.

If the tiles mainly consist of glass, soda-lime glass, borosilicate glass, aluminosilicate glass, lead glass, chalcogenide glass, crown glass and flint glass are preferred.

The following glass ceramics have been proven beneficially as glass ceramic tile materials: glass ceramics of the lithium aluminosilicate type, with high quartz mixed crystal or keatite mixed crystal as the main crystalline phase; glass ceramics of the magnesium zinc aluminosilicate type, with spinel mixed crystal, sapphirine mixed crystal, cordierite mixed crystal, enstatite mixed crystal, mullite mixed crystal or corundum as the main crystalline phase; glass ceramics of the lithium or lithium zinc silicate type, with lithium disilicate, petalite, lithium metasilicate or corresponding mixed crystals as the main crystalline phase; and glass ceramics of the boron phosphorus silicate type, with boron phosphorus as the main crystalline phase.

Particularly preferable are glass ceramics with a content of silicon dioxide of at least 5% by weight.

Glass ceramics in the sense of the present invention are preferably brittle fragile materials produced by partial crystallisation of glasses. In particular, "glass ceramics" are materials which have been converted from a glasslike into a partially crystalline condition by a temperature-time treatment, have been obtained by simultaneously sintering and crystallizing glass (sintered glass ceramics) or are at least partially crystallized by cooling a glass melt (crystallized glasses).

In comparison to ceramics, glass ceramics have the advantage that they can be produced cheaply, also in large formats, and that they have a low density. Based on the basis weight of a protection system, they are comparable with ceramics with respect to their final ballistic effect.

The polymer material of the polymer foil is preferably selected from the group consisting of polymers and copolymers on the basis of epoxy, polyvinyl butyrals, polyvinyl acetals, polyurethanes, polyethylene terephthalates, cross-linked and partially cross-linked polyisoprenes and polybutadienes as well as mixtures thereof. Preferably, the polymer foil has a density of 0.3 to 1.3 mm.

Preferably, the tiles of the protection device according to the present invention have base areas of 0.5 to 25 cm$^2$, more preferably 1 to 15 cm$^2$. In embodiments with triangular tiles these tiles preferably have base areas of 1 to 15 cm$^2$. In embodiments with hexagonal tiles preferably they have wrench sizes of 15 to 50 mm. In embodiments with trapezoid or pentagonal tiles preferably they have base areas of 10 to 25 cm$^2$. Preferably, the tiles of one tile package have a uniform height. Preferably, the layers of tiled and/or segmented brittle fragile material (tile packages), which are contained in the protection device according to the present invention, have a thickness of 2 to 25 mm, more preferably of 4 to 12 mm. Preferably, the tiles itself have heights of 1 to 22 mm, more preferably 3 to 12 mm, wherein preferably boards of this thickness are accordingly used in the production method thereof.

In a particular embodiment of the present invention the multiangular base areas of the tiles are not located in one plane, but the base areas of adjacent tiles are tilted to each other by tilt angles of between 0.1° to 30°, preferably 1° to 10°. Thus, in the case of bombardment it is achieved that on the one hand one tile will be heavily destroyed by the bullet, but on the other hand the adjacent tiles will nearly remain without any destruction and can also withstand a second hit which is near the first one. Only the present invention allows that protection devices with such designed tiles can be provided in a cost-effective way.

Non-segmented boards of brittle fragile materials, fiber materials, fiber composite materials, metals or other polymers can also be bonded together by the use of casting resins. The production conditions of such composites depend on those temperature, time and pressure parameters at which the casting resins experience cross-linking and/or hardening and develop an optimum adhesion to the areas which limit the casting resin layer.

The use of an above-described protection device in a bullet-proof vest, a vehicle or a building is also in accordance with the present invention.

Example 1

Glass Ceramic Tile Package A

Figure 1:
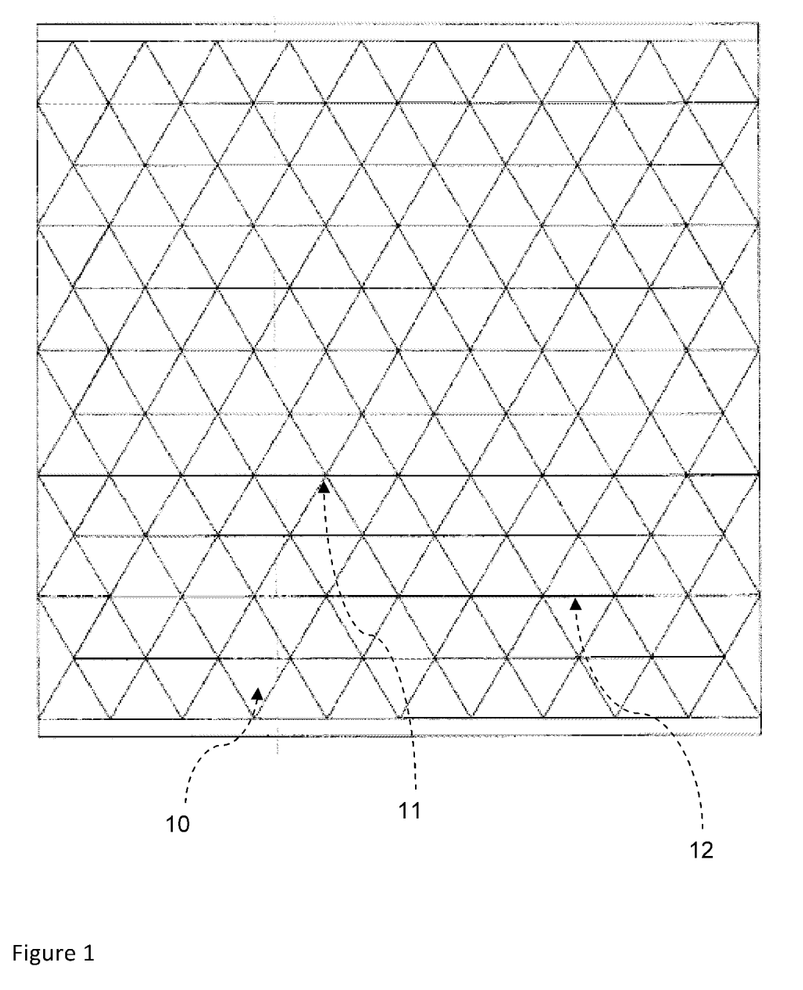
FIG. 1 shows a tile package according to the present invention.

The upper side of a glass ceramic board, which has a composition in line with DE 10 2008 050 263, a dimension of 500×500×5 mm$^3$ and high quartz mixed crystal as main crystalline phase, is scored with a 135° cutting wheel with the help of Silberschnitt cutting solution (cutting lubricant), wherein a pattern of mainly equilateral triangles having an edge length of 50 mm which corresponds to FIG. 1 is produced.

A transparent polyurethane foil of the type A4700 (Deerfield Urethane) with a thickness of 0.635 mm is laminated according to the lamination guidelines of Deerfield on the lower side of the scored glass ceramic board, which has burlings. Subsequently, the scoring lines are exposed to tensile stress and the scored glass ceramic board is fractured along the scoring lines, whereby gaps and intersection points are created and a tile package according to the present invention is obtained.

Example 2

Glass Ceramic Tile Package B

Figure 2:
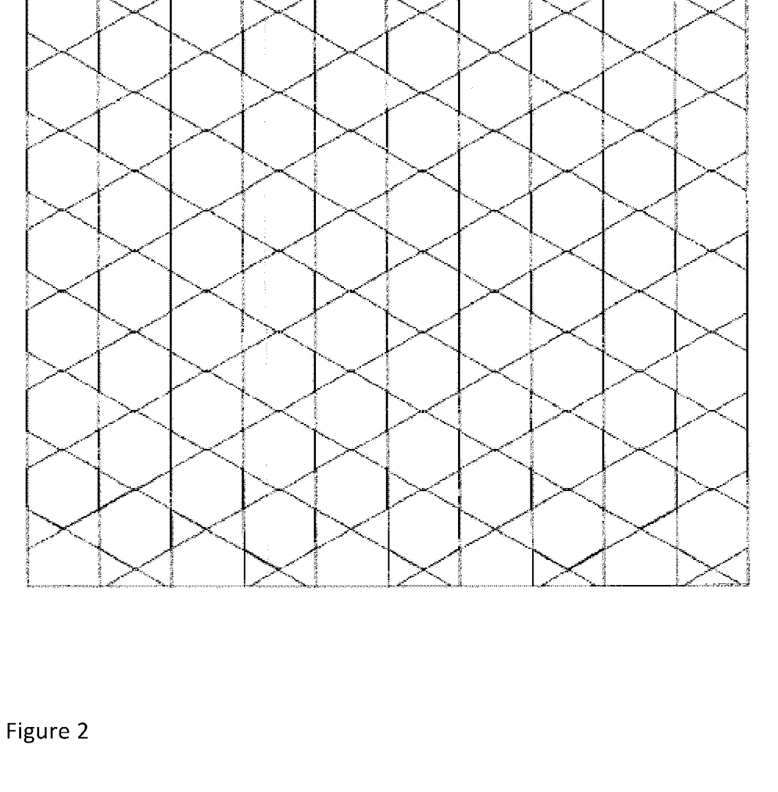
FIG. 2 shows a tile package according to the present invention with triangular and hexagonal tiles.

The upper side of a glass ceramic board, with a composition as described in DE 10 2008 050 263, a dimension of 500×500×8 mm$^3$ and keatite mixed crystal as main crystalline phase is scored with a 140° cutting wheel with the help of "Silberschnitt cutting solution", wherein a pattern of mainly equilateral triangles and hexagons which corresponds to FIG. 2 is produced. The hexagons have a wrench size of 50 mm and the equilateral triangles have an edge length of 28.87 mm.

A transparent polyurethane foil of the type A4700 (Deerfield Urethane) with a thickness of 0.635 mm is laminated according to the lamination guidelines of Deerfield on the lower side of the scored glass ceramic board, which has burlings. Subsequently, the scoring lines are exposed to tensile stress and the scored glass ceramic board is fractured along the scoring lines, whereby gaps and intersection points are created and a tile package according to the present invention is obtained.

Example 3

Figure 3:
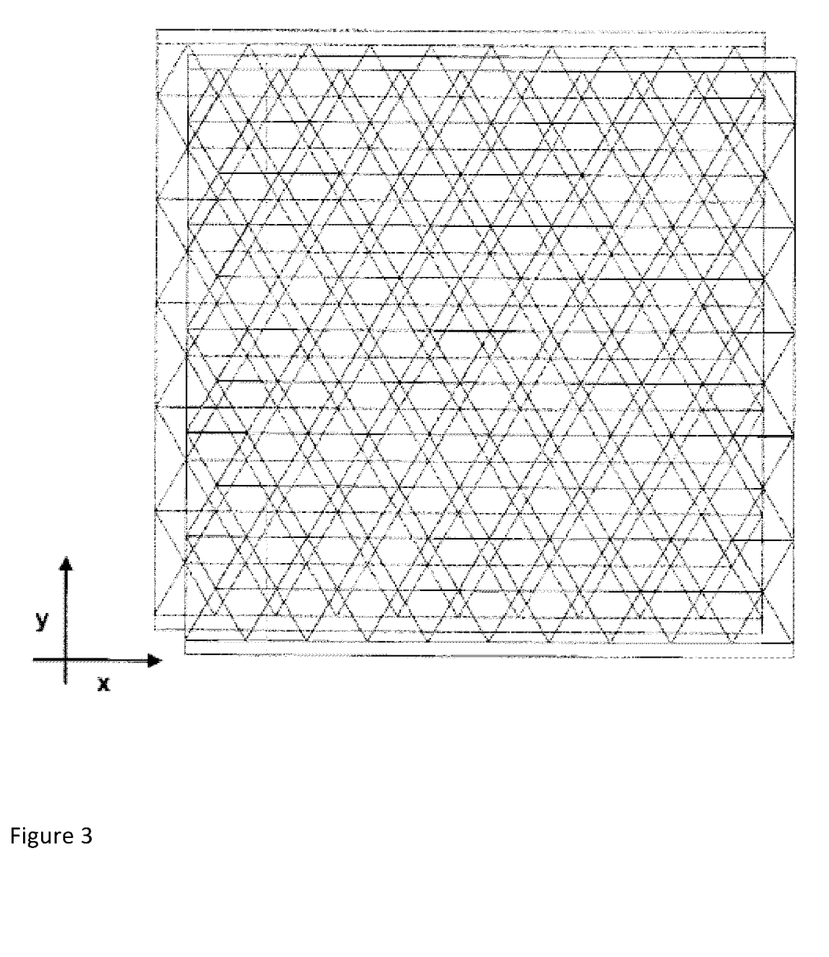
FIGS. 3 and 4 each show two tile packages according to the present invention which are arranged on top of each other.

Two glass ceramic tile packages A are laid on top of each other with an offset of x=25 mm and y=−21.65 mm, as shown in FIG. 3. Below the foil of the glass ceramic tile package, which is not offset, a backing layer of polycarbonate (Makrolon®, Bayer) having a thickness of 5 mm is provided laid on an intermediate layer of transparent polyurethane of the type A4700 (Deerfield Urethane) having a thickness of 1.27 mm. According to the lamination guidelines of Deerfield a glass ceramic-polymer composite is prepared with a final thickness of 17.5 mm. The basis weight is 34.75 kg/m$^2$. This composite withstands a 4 hit bombardment according to the bombardment pattern of ATPD 2352 P (so-called "STANAG-T") with 5.56×17.8 mm soft-core munition with 315 m/s at a distance of 15 m.

Example 4

Figure 4:
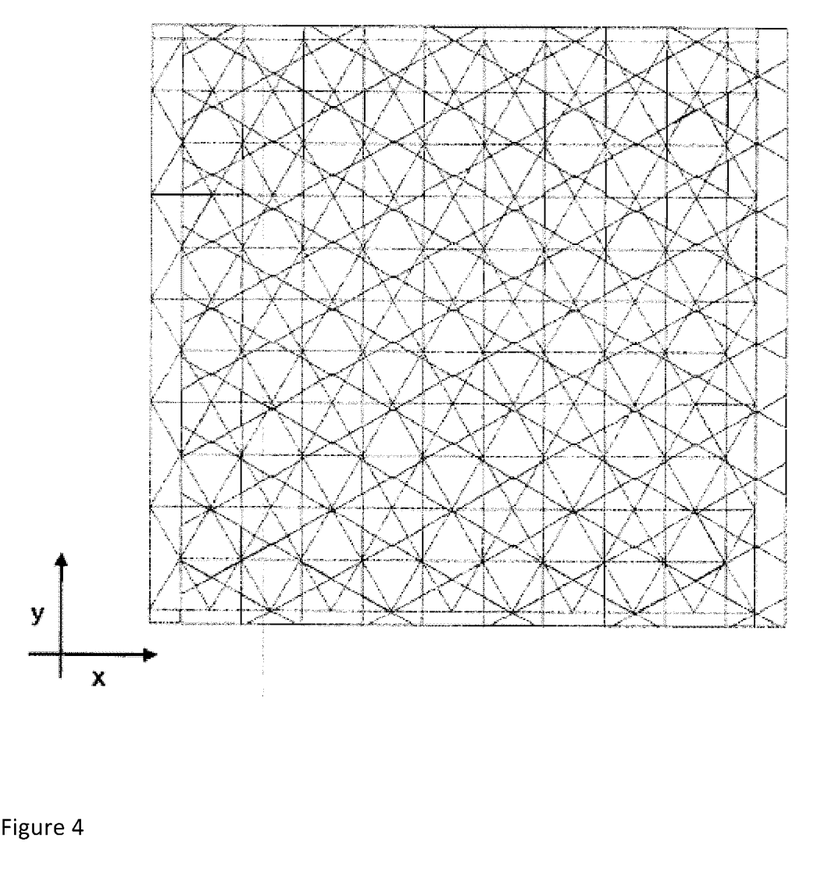

A glass ceramic tile package A and a glass ceramic tile package B are laid on top of each other with an offset of x=25 mm and y=0 mm (FIG. 4). Below the foil of the glass ceramic tile package, which is not offset, a polycarbonate disc (Makrolon®, Bayer) having a thickness of 5 mm is provided laid on an intermediate layer of transparent polyurethane of the type A4700 (Deerfield Urethane) having a thickness of 1.27 mm. According to the lamination guidelines of Deerfield a glass ceramic-polymer composite is prepared. Its final thickness is 20.5 mm. The basis weight is 42.55 kg/m$^2$.

This composite withstands a 4 hit bombardment according to the bombardment pattern of ATPD 2352 P (so-called "STANAG-T") with 9×19 mm soft-core munition with 400 m/s at a distance of 5 m.

Example 5

Figure 5:
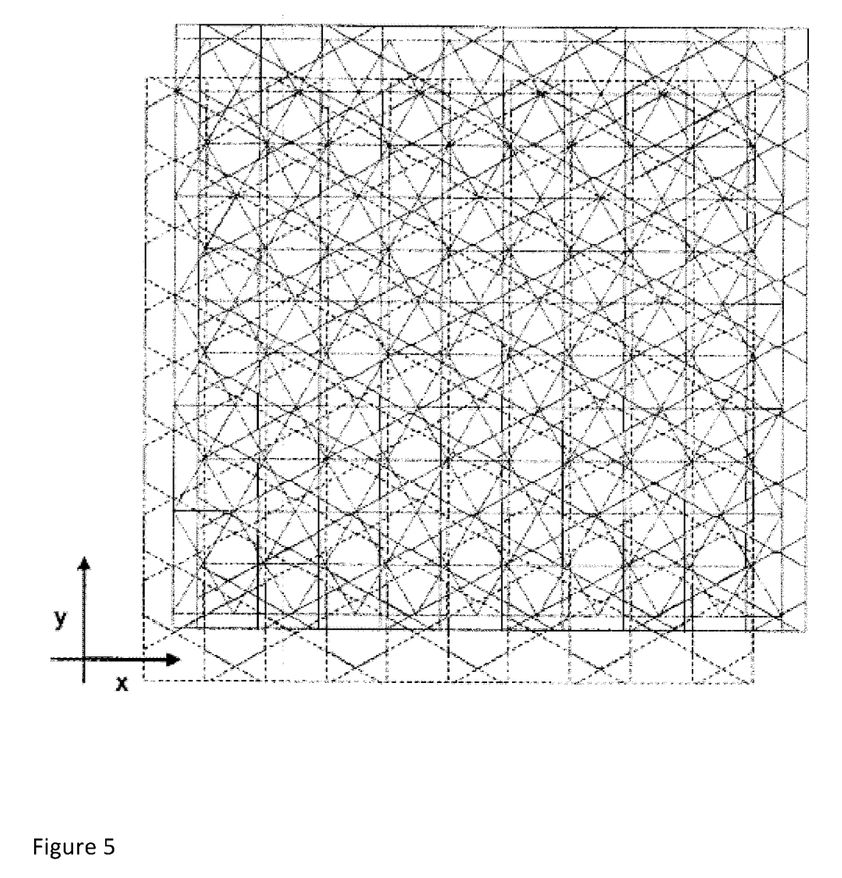
FIG. 5 shows three tile packages according to the present invention which are arranged on top of each other and arranged in an offset manner.

A glass ceramic tile package A and two glass ceramic tile packages B are laid on top of each other with an offset of x=−25 mm and y=−50 mm (package A to the first package B) as well as x=20 mm and y=0 mm (package A to second package B) (FIG. 5). Below the foil of the glass ceramic tile package, which is not offset, a fiber composite mat of Kevlar woven fabric ("Low Modulus" Kevlar: density 1.45 g/cm$^3$, having a tensile strength of 2800 N/mm$^2$ and an elastic modulus of 59 kN/mm$^2$; epoxide resin as adhesive; DuPont) having a thickness of 5 mm is provided laid on an intermediate layer of transparent polyurethane of the type A4700 (Deerfield Urethane) having a thickness of 1.27 mm. According to the lamination guidelines of Deerfield the glass ceramic-polymer composite is prepared. Its final thickness is 28.5 mm. The basis weight is 64.6 kg/m$^2$.

This composite withstands a 4 hit bombardment according to the bombardment pattern of ATPD 2352 P (so-called "STANAG-T") with 7.62 mm×51 NATO soft-core munition with 830 m/s at a distance of 10 m.

The figures are for illustration of the subject matter of the present invention and they do not limit the subject matter of the patent claims.

FIG. 1 shows a tile package according to the present invention, comprising triangular tiles (10) which are separated from each other by gaps (12). The gaps meet at intersection points (11).

FIG. 2 shows a tile package according to the present invention, comprising triangular and hexagonal tiles.

FIGS. 3 and 4 each show two tile packages according to the present invention which are arranged on top of each other. In FIG. 3 the tiles are arranged in an offset manner such that the intersection points of the gaps do not correspond with each other.

FIG. 5 shows three tile packages according to the present invention which are arranged on top of each other and arranged in an offset manner such that the intersection points of the gaps do not correspond with each other.

Figure 6:
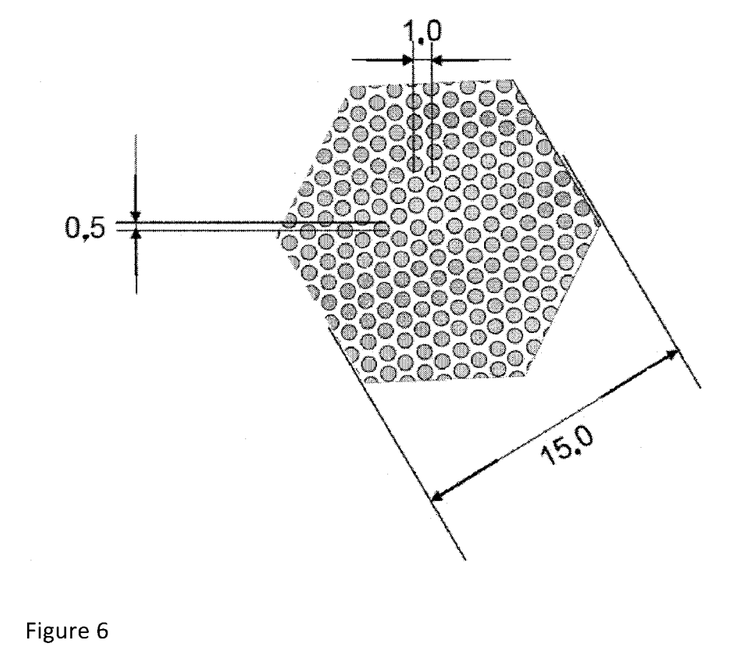
FIG. 6 shows a hexagonal-prismatic tile.

FIG. 6 shows a hexagonal-prismatic tile, which can be part of a protection device according to the present invention, having a wrench size of 15.0 mm with an ellipsoid dome-shaped burling structure in top view. The semimajor axis of the burlings is 0.5 mm. The distance of adjacent burling peaks is 1.0 mm.

For illustration, in FIGS. 7 to 10 the tile packages are individually presented as tile layers 16 and polymer foils 17. One tile layer 16 followed by a polymer foil 17 represents a tile package.

Figure 7:
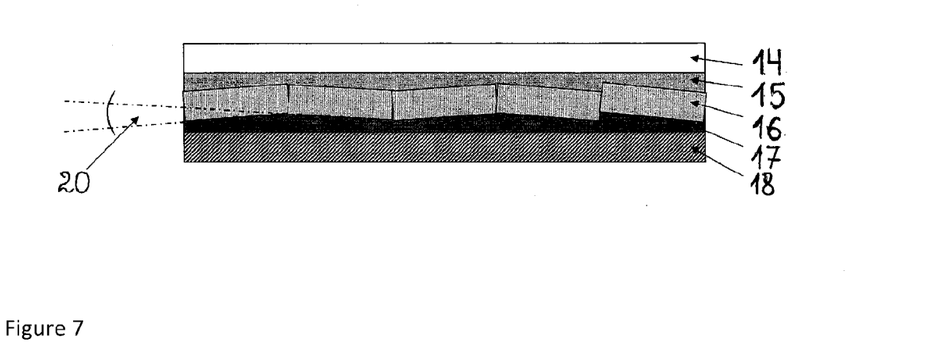
FIGS. 7 to 10 show tile packages that are individually presented as tile layers and polymer foils.

FIG. 7 shows a cross section of a protection device according to the present invention, comprising a cover board 14, an intermediate layer 15, a tile layer 16, a polymer foil 17 and a non-segmented board 18. The individual tiles are arranged in a tilted manner. The tilt angle 20 is 1° to 10°.

Figure 8:
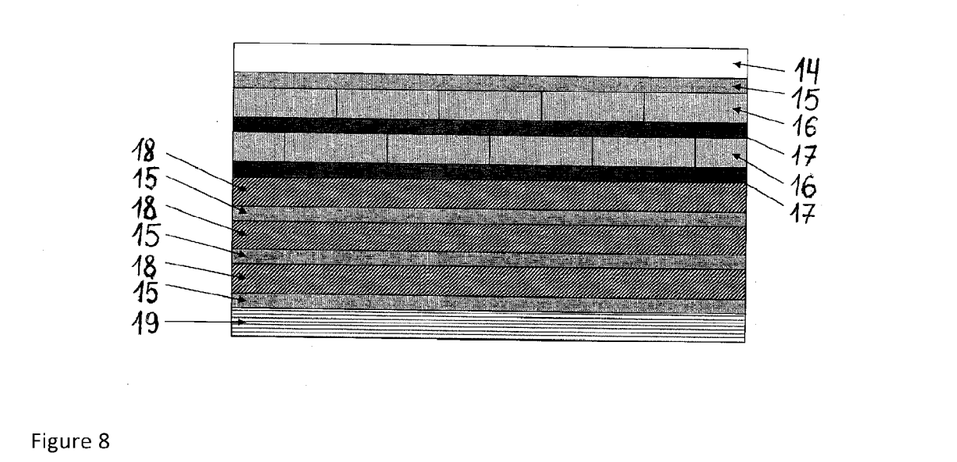

FIG. 8 shows a cross section of a protection device according to the present invention, comprising the following elements: cover board 14, four intermediate layers 15, two tile layers 16, two polymer foil layers 17, three non-segmented boards 18 and a backing layer 19.

Figure 9:
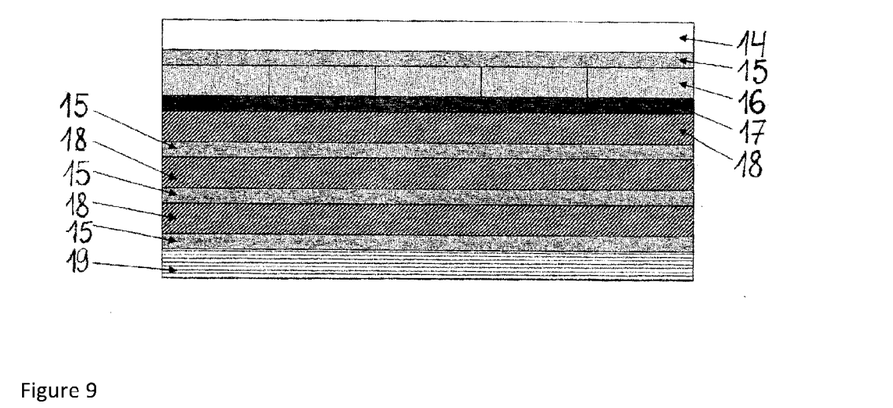

FIG. 9 shows a cross section of a protection device according to the present invention, comprising a cover board 14, four intermediate layers 15, a tile layer 16, a polymer foil 17, three non-segmented boards 18 and a backing layer 19.

Figure 10:
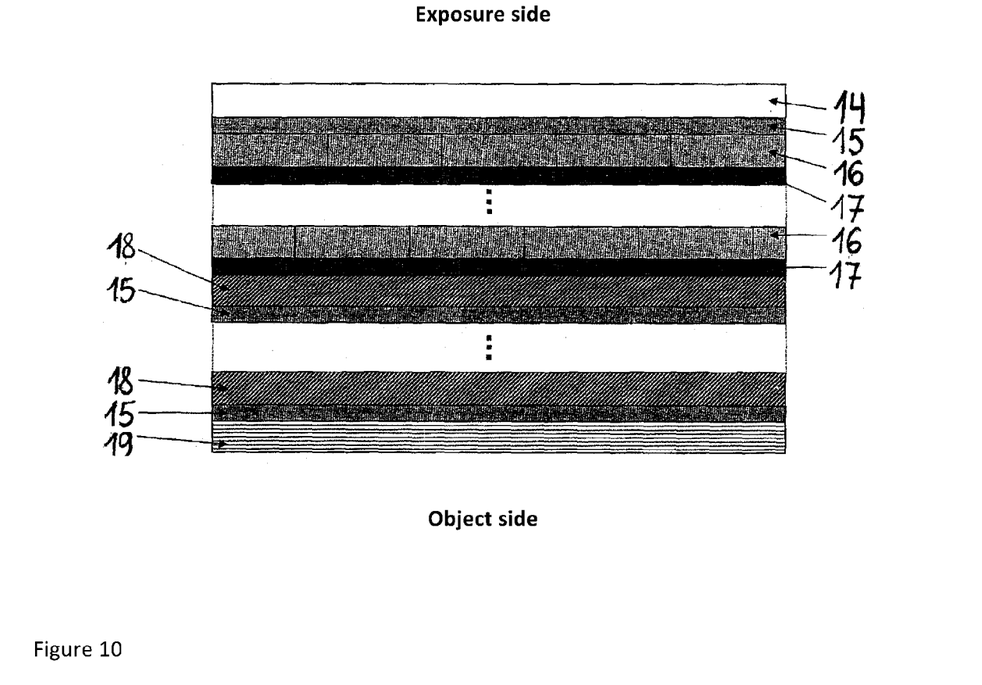

FIG. 10 shows a cross section of a protection device according to the present invention, comprising a cover board 14, three intermediate layers 15, two tile layers 16, two polymer foils 17, two non-segmented boards 18 and a backing layer 19. In this case the cover board 14 is on the exposure side and the backing layer 19 is on the object side. The layers which are identified with three points represent an arbitrary number of layers and sequences, consisting of tile layers and polymer foils (16 and 17) or intermediate layers and non-segmented boards (15 and 18). It can be seen, that the gaps of the tile packages only correspond in special points and do not lay on top of each other.

LIST OF REFERENCE SIGNS

10 tile
11 intersection point
12 gap
14 cover board
15 intermediate layer
16 tile layer
17 polymer foil
18 non-segmented board
19 backing layer
20 tilt angle

What is claimed is:

1. A method for the preparation of a protection device, comprising providing a tile package, wherein the step of providing the tile package comprises:
   laminating at least one board of a tile material onto a polymer foil;
   scoring the at least one board on a side which is opposite to the polymer foil; and
   fracturing the board along scoring lines formed by the scoring to form resulting tiles, wherein the resulting tiles remain fixed on the polymer foil,
   wherein the protection device comprises at least two layers, each of the at least two layers comprising at least one tile package each comprising a tile layer and a polymer foil, wherein the tiles adjoin at gaps and are mounted together on the polymer foil, wherein the intersection points of the gaps of each tile package are oppositely arranged to tiles of the respective following tile package.

2. The method according to claim 1, wherein the at least one board has burlings on at least one side onto which the polymer foil is applied.

3. The method according to claim 1, wherein the resulting tiles are fiber-reinforced.

4. The method according to claim 1, further comprising arranging at least one cover board as a further layer on an exposure side of the protection device.

5. The method according to claim 1, further comprising arranging at least one backing layer on an object side of the protection device.

6. The method according to claim 1, wherein the resulting tiles consist of glass or glass ceramic.

7. The method according to claim 1, further comprising using the protection device as a component of a bullet-proof vest, a vehicle, or a building.

8. A method for the preparation of a protection device, comprising:
   laminating at least one board of a tile material onto a flexible foil;
   scoring the at least one board to form score lines on a side opposite to the flexible foil; and
   fracturing the board along the scoring lines to form resulting tiles that remain fixed on the flexible foil.

9. The method according to claim 8, wherein the flexible foil comprises a polymer.

10. The method according to claim 9, wherein the polymer is selected from the group consisting of polyvinyl butyral-type, thermoplastic polyurethane-type, and ethylene vinylacetate-type.

11. The method according to claim 8, further comprising arranging the resulting tiles towards an exposure side.

12. The method according to claim 11, further comprising using the protection device as a component of a bullet-proof vest.

13. The method according to claim 8, further comprising using the protection device as a component of a bullet-proof vest.

14. A method for the preparation of a protection device, comprising providing a tile package, wherein the step of providing the tile package comprises:
   laminating at least one board of a tile material onto a polymer;
   scoring the at least one board on a side which is opposite to the polymer; and
   fracturing the board along scoring lines formed by the scoring to form resulting tiles, wherein the resulting tiles remain fixed on the polymer, wherein the protection device comprises at least two layers, each of the at least two layers comprising at least one tile package each comprising a tile layer and a polymer, wherein the tiles adjoin at gaps and are mounted together on the polymer, wherein the intersection points of the gaps of each tile package are oppositely arranged to tiles of the respective following tile package.

15. The method according to claim 14, wherein the polymer is a flexible polymer foil.

16. The method according to claim 15, wherein the flexible polymer foil is selected from the group consisting of polyvinyl butyral-type, thermoplastic polyurethane-type, and ethylene vinylacetate-type.

* * * * *